July 14, 1959  K. C. ZEIGLE  2,894,287
MOLD FOR MAKING FEED ROLLS FOR STAMP VENDING MACHINES
Filed Nov. 2, 1954  2 Sheets-Sheet 1

INVENTOR
KENNETH C. ZEIGLE
BY
Williamson, Williamson, Schroeder & Adams
ATTORNEYS

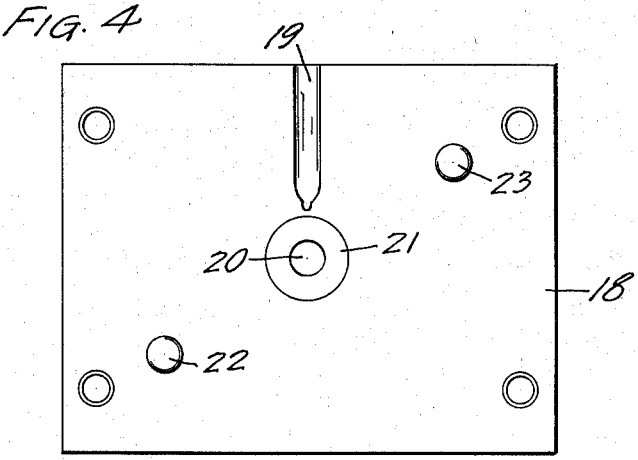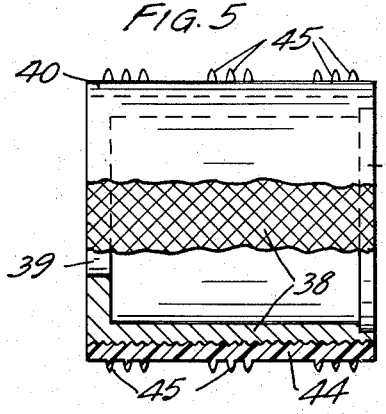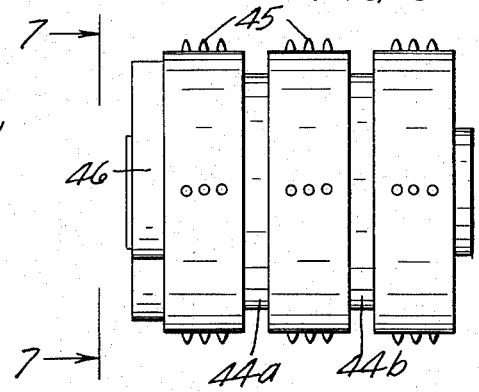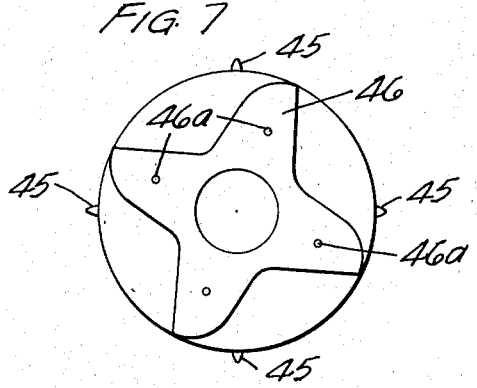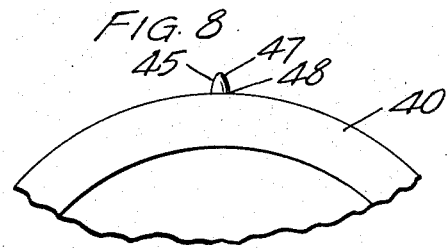

# 2,894,287

MOLD FOR MAKING FEED ROLLS FOR STAMP VENDING MACHINES

Kenneth C. Zeigle, Minneapolis, Minn., assignor to Electric Vendors, Inc., Minneapolis, Minn., a corporation of Minnesota Application November 2, 1954, Serial No. 466,350

2 Claims. (Cl. 18—42)

This invention relates to feed rolls for stamp vending machines and the like. More particularly, it relates to a mold for manufacturing an economic feed roll for such machines.

In the manufacture of stamp vending machines and the like, one of the most important parts to be constructed is the feed roll. It is the feed roll which drives or progresses the stamps through such a machine. Because of its important function it is imperative that the feed roll be very accurately formed else the strip of stamps may be damaged or may become misaligned and/or the machine may become fouled. In prior stamp vending machines the operable feed rolls were prepared through a very laborious, tedious, and expensive operation. They generally were made of a metal cylinder into which small holes were bored. Into these small holes metal pegs were secured. Previously the pegs were machined to the desired size and shape insofar as was possible to form the desired teeth required to fit into the openings of the perforated stamp roll to effect the progression of the stamps through the machine. This method of forming the feed rolls is very unsatisfactory in that it is very difficult to manufacture the feed rolls according to specifications and it is very costly because of the time and labor required.

Various attempts have been made to form these feed rolls by well known casting methods, but the teeth on these feed rolls are necessarily of such small size both in diameter and length that such attempts have been unsuccessful. The air trapped in each tooth-forming recess would prevent the formation of accurate and uniform teeth with the result that the manufacturers have had to return to the old tedious and expensive method of placing pegs into drilled holes after machining them to the desired shape and size. My invention is directed toward solving these problems.

It is a general object of my invention to provide a novel mold for forming a feed roll for stamp vending machines and the like.

A more specific object is to provide a novel mold for forming a feed roll for such machines which will reduce the cost of production of such feed rolls to approximately 10% of their former cost.

Another object is to provide a novel and improved mold for producing feed rolls for stamp vending machines and the like which will produce such feed rolls without having to set each tooth therein separately and without having to form each tooth separately from the main body of the roll.

Another object is to provide a novel and improved mold for forming feed rolls for stamp vending machines and the like which will produce a feed roll in substantially less time and with less labor.

These and other objects and advantages of my invention will more fully appear from the following description made in connection with the accompanying drawings, wherein like reference characters refer to the same or similar parts throughout the several views, and in which:

Fig. 4 is a plan view of the inner surface of the closure member which registers with the base member of the mold when secured thereto.

Fig. 5 is a side elevational view of my novel feed roll as it leaves the mold with a portion thereof shown in section.

Fig. 6 is a side elevational view of the completed feed roll after it has had the grooves cut into the cylinder, and after the driving gear has been secured thereto.

Fig. 7 is an end elevational view taken along line 7—7 of Fig. 6.

Fig. 8 is a fragmentary end elevational view of one of the feed rolls on an enlarged scale showing the detail of one of the teeth of the feed roll.

Figure 1:
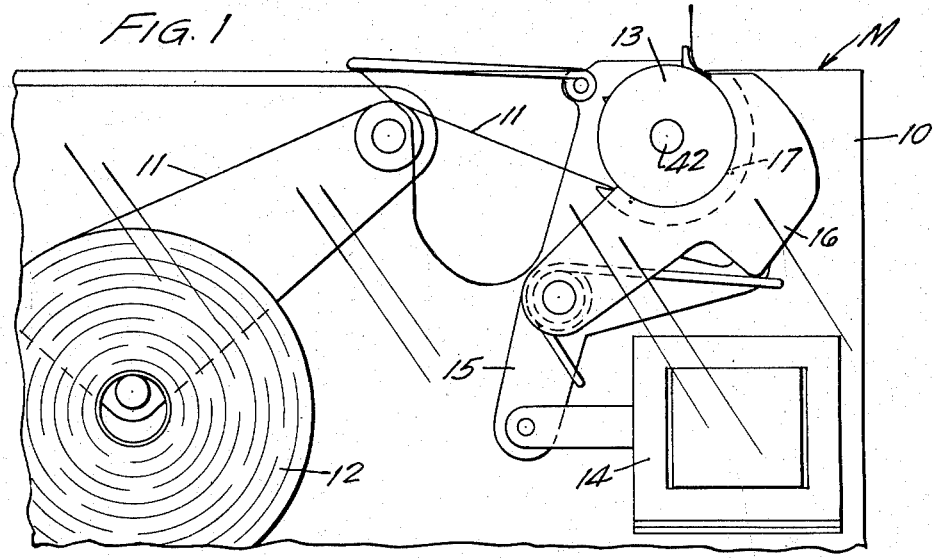
Fig. 1 is a fragmentary side elevational view of a stamp vending machine having one embodiment of my invention mounted therein for rotation to progress the stamps through the stamp vending machine.

Fig. 1 shows a feed roll constructed in accordance with my invention mounted for rotation in a stamp vending machine indicated generally as M and supported by the frame 10 thereof so as to extend transversely of the direction of movement of the stamps 11 as they unroll from the stamp roll 12. The stamps are progressed through the machine by the feed roll 13 which is actuated by a solenoid 14 through connecting linkage 15. It will be noted that the stamps 11 pass around the circumferential surface of the feed roll 13 and between the roll and the stamp guides 16, the teeth 17 of the feed roll extending through the perforation between the individual stamps and thereby engaging the stamp strip to cause the stamps to progress through the machine. Important details of such a stamp vending machine other than the feed roll 13 can be seen by reference to a related application of which I am co-inventor and entitled, Stamp Vending Machine, Serial Number 447,766 filed August 4, 1954.

Figure 2:
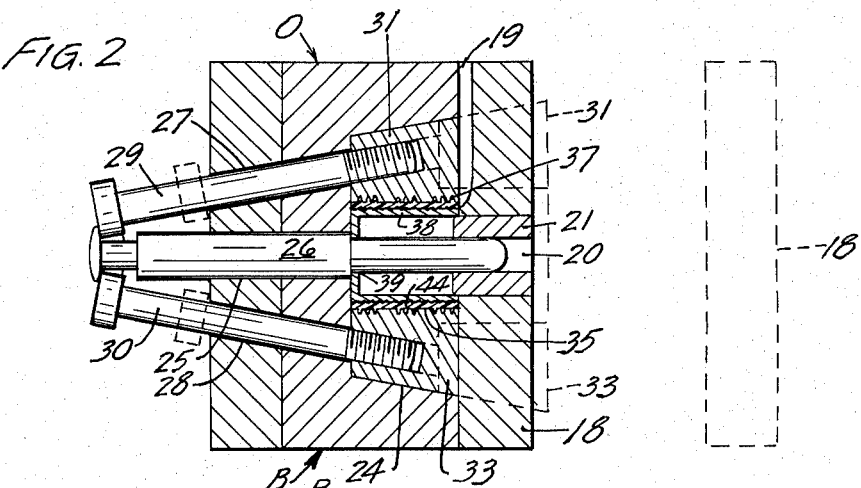
Fig. 2 is a vertical sectional view of my mold designed to construct my improved feed roll, with the closure member detached therefrom shown in broken lines.

To form the stamp feed roll I have provided a novel mold indicated generally as O in Fig. 2 and comprised of a base member B and a cover or closure member 18. The cover or closure member, as best seen in Fig. 4, has a sprue hole 19 formed therein which connects the central portion of the mold which is the cavity thereof, as will be hereinafter described, with the exterior. A pin-receiving opening 20 is formed at the central portion of the closure member 18 and is defined by a bearing 21 which is adapted to receive a central pin therein in tight-fitting relationship. A pair of alignment pins 22 and 23 extend inwardly from the inner surface of the closure member so as to properly align the closure member with the base member B when the two members are brought together and secured to each other in any of the conventional manners in pressure molding.

The base member has a recess 24 formed therein and positioned centrally thereof. When the closure member 18 is secured to the base member B, this recess becomes a closed compartment. The recess 24 is tapered downwardly, as best shown in Fig. 2. Alignment holes H adapted to receive the alignment pins 22 and 23 are provided in the recess-defining portions of the base member B and are not shown. The base member has a central pin-receiving opening which extends therethrough axially of the recess 24. Slidably mounted in this opening is an insert-receiving pin 26 which extends upwardly into the recess 24. Four stripper bolt passages such as 27 and 28 are arranged around the pin-receiving opening 25 and extend through the base member parallel to the tapered walls of the recess 24. As can best be seen in Fig. 2, these recesses extend upwardly in diverging relation into the peripheral portions of the bottom of the recess. Slidably mounted in each of these passages, such as 27 and 28, is a stripper bolt such as 29 and 30.

Mounted on each of the stripper bolts such as 29, 30 is one of four matrix sections 31, 32, 33 and 34, which fit within the recess 24 and cooperatively define a cylindrical cavity 35 therebetween in conjunction with the base member B and the closure member 18, the axis of the cavity being the same as the longitudinal axis of the pin 26. Each of the matrix sections has opposite side surfaces such as 31a and 31b which register in tight-fitting relationship with one of the side surfaces of the adjacent matrix section to form a break line 36 therebetween. Each of these side surfaces such as 31a and 31b is flat and smoothly polished so as to perfect a substantial seal with its adjacent surface so that material forced into the cavity 35 cannot pass outwardly therebetween in any substantial amount. Each of the matrix sections 31, 32, 33 and 34 tapers at the bottom, as best shown in Fig. 2, and the outer arcuate surface thereof conforms to the curvature of the recess 24 so that when the closure member 18 is secured to the base member B, the four matrix sections fit snugly together and fill the more peripheral portions of the recess 24 and leave only the cylindrical cavity 35 therebetween.

Figure 3:
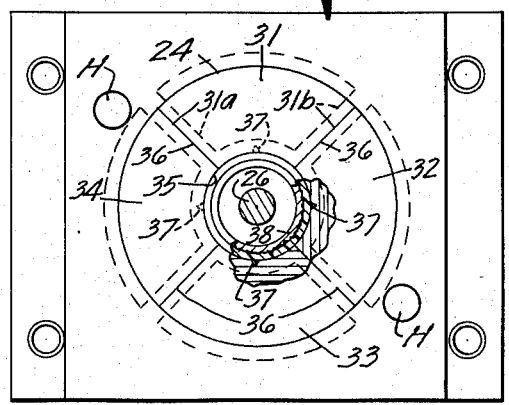
Fig. 3 is a top plan of the mold with the closure member removed from the base member and with a feed roll formed therein.

Each of the matrix sections 31, 32, 33 and 34 has a plurality of spaced teeth-forming recesses such as 37 formed in the cavity-defining surfaces thereof. As best shown in Figs. 2 and 3, these recesses are arranged in spaced groups of three along lines parallel to the axis of the cylindrical cavity and are positioned midway between the flat side surfaces such as 31a and 31b. Each of the recesses tapers radially outwardly toward a point and is conical in shape. Each has a magnitude of approximately .047 inch in depth and .032 inch in diameter, or of the order of magnitude in size of .05 inch in depth and .03 inch in maximum diameter.

To form the feed roll the closure member 18 is removed from the base member B of the mold and a hollow cylindrically shaped metal insert is placed around the insert-receiving pin 26 within the cavity 35. This insert 38 is preferably of a light metal such as aluminum and has an opening 39 at one end which snugly fits around the reduced portion of the insert-receiving pin, as best shown in Fig. 2. The other end of the insert remains open so that the bearing 21 carried by the closure member 18 extends thereinto to snugly hold the insert in proper place. The outer cylindrical surface of the insert 38 is knurled.

After the insert has been positioned as described above, hot white nylon is forced into the sprue hole 19 under substantial pressure. This hot white nylon is one of the polyamides currently being manufactured and sold by E. I. du Pont de Nemours & Co., Wilmington 98, Delaware and bears the trade-name of F.M. 10,001. This particular polyamide is unusually hard and wears very well. This white nylon is injected through the sprue hole at a temperature of approximately 525 degrees Fahrenheit and at pressures of approximately 1,200 p.s.i. The mold O is permitted to remain at room temperature.

It will be noted that the sprue hole 19 connects the exterior with the space between the surfaces defining the cavity 35 and the exterior of the insert 38 so that the whie nylon is forced into this open area and into the minute recesses 37. It will be noted that the recesses of this mold are not at the break line as is usual in forming teeth on a cylindrical surface, but on the contrary are positioned midway between the break lines 36. This is contrary to conventional molding. If the recesses 37 were positioned at the break lines, a web would form between the teeth so that the entire structure would be unsatisfactory. It is necessary that these recsses be positioned at points other than the break line in order to form a satisfactory end product.

After the hot white nylon has been forced into the mold as described above, the closure member 18 is removed and the stripper bolts such as 29 and 30 and the insert-receiving pin 26 are forced outwardly so as to move the matrix sections 31, 32, 33 and 34 from the recess 24. As these matrix sections move toward the right, as viewed in Fig. 2, they move both axially and radially outwardly relative to the cavity 35 so that they will separate and the molded cylindrical feed roll will be suspended by the reduced end portion of the insert-receiving pin 26. The molded feed roll may then be quickly and easily withdrawn from the free and reduced end of the insert-receiving pin 26 and it is ready for the finishing steps to be hereinafter described. For practical purposes, however, the feed roll at this point has been formed.

After being removed from the mold, the feed roll indicated generally as 40, as best shown in Fig. 5, has an end plate 41 pressed into the open end thereof. This end plate has a central opening therein which merely serves as a bearing for the mounting pin 42, as shown in Fig. 1, which rotatably mounts the feed roll when it is in use. The feed roll 40 is then ready, if desired, for use in a stamp vending machine. If, however, it is desired to provide automatic means for cutting off the current to the vending machine as disclosed and claimed in the application hereinbefore referred to, then the grooves 44a and 44b may be cut by a lathe into the cylindrical segment 44 of white nylon which has been molded onto the exterior surface of the insert. It will be noted that the grooves 44a and 44b are positioned between the groups of teeth 45 which were formed by the recesses 37. To drive the feed roll, a drive gear 46 may be secured to one end thereof by pins such as 46a. The details of construction of this drive gear are also disclosed in the application hereinbefore referred to. It will be noted that the resulting feed roll is a cylinder adapted to be mounted for rotation in a stamp vending machine for rotation about its axis while positioned transversely of the direction the stamps move. The white nylon cylinder 44 has a plurality of teeth 45 molded in situ integrally with the cylinder 44 and these teeth are arranged in rows along a line parallel to the axis of rotation of the cylinder. As best shown in Fig. 1, they are spaced transversely of the stamps and they engage the openings of these stamps to progress the same through the machine. As best shown in Fig. 6, the teeth 45 are spaced circumferentially of the cylinder 44.

Fig. 8 shows a detailed view of one of the teeth 45. There is a radius of curvature of $\frac{1}{46}$ inch adjacent the point of the tooth as at 47. The length of the tooth from the cylinder out to its point is .047 inch and the diameter of the tooth at its base is .032 inch. The radius of curvature at the point where the tooth leaves the circumferential surface of the cylinder 44 as at 48 is .005 inch.

Thus it can be seen that I have provided a novel and improved mold for forming an improved feed roll for stamp vending machines and the like. It was previously considered impossible to mold feed rolls of this nature because of the minute size of the required teeth. Various molding attempts previously performed were unsuccessful because the metal would not enter into the small recesses provided for the teeth and as a result the teeth either were not formed at all, or were too imperfect to be satisfactory for use. Also ordinarily in molding when teeth or gears are to be formed, the recesses for forming them are arranged along the break lines of the sectional mold instead of at the medial portions of the molding surface. Such an arrangement, however, when pressure is used to force a molten material into such tiny recesses, is highly unsatisfactory because webs form between the adjacent teeth and make the resultant product unusable. I have found, however, that by forming the recesses at points removed from the break line and then injecting hot molten white nylon, the recesses in the die will be completely filled to provide accurately formed teeth which will meet specifications. As a result a feed roll constructed or formed in accordance with my invention will cost substantially less to be manufactured than will a feed roll constructed in the conventional and previously known manner as hereinbefore described. I have found that I can manufacture a feed roll in accordance with my novel mold which will perform in an even more satisfactory manner than those manufactured by previously known methods and which will cost only approximately 1/10 what the feed rolls manufactured by previously known methods will cost.

It should be noted that the conventional manner of manufacturing products with outwardly extending teeth has been to form a mold with the teeth recesses positioned at the break lines in order to facilitate extraction of the molded product. The molded product can then be slid outwardly along the break line and removed without great difficulty. This method, however, is not feasible when very minute teeth such as are required in a stamp feed roll are desired. It will be noted that I have designed a mold which will not only permit the teeth to be formed in such a manner as to be disposed away from the break lines, but will also cause sections of the mold to move away from all parts of the molded end product in order to facilitate its removal.

The most important advantage of my mold, of course, is that the end product can be manufactured so rapidly and inexpensively. Large numbers of feed rolls can be manufactured in a relatively short time through the use of my mold. In addition, the end product is more accurately formed than if the feed roll were prepared by previously known molds. Also, the end products are more uniform in structure and quality.

It will, of course, be understood that various changes may be made in the form, details, arrangement and proportions of the various parts without departing from the scope of my invention.

What is claimed is:

1. A mold for forming a feed roll for stamp vending machines and the like, said mold comprising a base member having a recess formed in a surface thereof, said recess tapering inwardly from said surface to the bottom of said recess, a closure member adapted to extend across said recess to close off the same and to be secured to said base member, four separate matrix sections mounted within said recess and extending between said base member and said closure member and cooperatively defining a cylindrical cavity therebetween, said matrix sections having outer tapered surfaces complementary to the tapered surfaces of said recess, one of said members having a sprue hole formed therein connecting said cavity with the exterior for the introduction of molten material therethrough, each of said sections having a pair of opposite side surfaces each registering in tight-fitting substantially sealing relation with a side surface of one of the other of said sections and defining a break line therebetween, some of said sections having a plurality of minute conically shaped teeth-forming recesses formed in their cavity-defining surfaces and spaced along lines extending parallel to the axis of the cylindrical cavity, said recesses being in noncommunicating relationship with the portions of said sections which define said break lines and in noncommunicating relationship to each other, said base member having a pin receiving opening formed therethrough and communicating with said recess, a pin slidably positioned within said opening, said pin including a surface for engaging a portion of an article within said cavity, said base member having a plurality of openings formed therethrough extending an oblique angle to said first-mentioned opening and being in communication with said recess, a stripper bolt slidably positioned within each of said obliquely extending openings such that said stripper bolts extend obliquely of said pin, each of said stripper bolts being connected to one of said matrix sections, said pin and said stripper bolt having interengaging means formed thereon for causing the stripper bolts and pin to move in unison in a longitudinal direction with respect to the mold, whereby the pin and article move longitudinally in unison with said matrix sections while said matrix sections move radially outward away from the article to thereby eliminate strain on the molded teeth of the article and prevent damage thereto.

2. The structure as defined in claim 1 wherein said recesses are of the order of magnitude in size of .05 inch in depth and .03 inch in maximum diameter.

References Cited in the file of this patent

UNITED STATES PATENTS

| | | |
|---|---|---|
| 1,052,081 | Miltner | Feb. 4, 1913 |
| 1,286,681 | Laudenbeck | Dec. 3, 1918 |
| 1,349,122 | Edlund | Aug. 10, 1920 |
| 1,473,857 | Kempton | Nov. 13, 1923 |
| 1,871,982 | Geyer | Aug. 16, 1932 |
| 2,358,857 | Gits | Sept. 26, 1944 |
| 2,366,475 | Bartholomew | Jan. 2, 1945 |
| 2,404,631 | Gronemeyer | July 23, 1946 |
| 2,529,091 | Lester | Nov. 7, 1950 |
| 2,534,948 | Brummer et al. | Dec. 19, 1950 |

FOREIGN PATENTS

| | | |
|---|---|---|
| 1,373 | Great Britain | Nov. 30, 1889 |